(12) United States Patent
Dworak

(10) Patent No.: US 11,276,108 B2
(45) Date of Patent: Mar. 15, 2022

(54) USER INTERFACES FOR MANAGING LISTINGS IN A SECONDARY MARKETPLACE

(71) Applicant: StubHub, Inc., San Francisco, CA (US)

(72) Inventor: Adam Dworak, Chicago, IL (US)

(73) Assignee: StubHub, Inc., San Francisco, CA (US)

( * ) Notice: Subject to any disclaimer, the term of this patent is extended or adjusted under 35 U.S.C. 154(b) by 2 days.

(21) Appl. No.: 16/661,640

(22) Filed: Oct. 23, 2019

(65) Prior Publication Data
US 2021/0125265 A1 Apr. 29, 2021

(51) Int. Cl.
*G06Q 30/06* (2012.01)
*G06F 3/0482* (2013.01)
*H04L 12/58* (2006.01)
*H04L 51/046* (2022.01)

(52) U.S. Cl.
CPC ....... *G06Q 30/0641* (2013.01); *G06F 3/0482* (2013.01); *H04L 51/046* (2013.01)

(58) Field of Classification Search
CPC .. G06F 3/0482; G06Q 30/0641; H04L 51/046
See application file for complete search history.

(56) References Cited

U.S. PATENT DOCUMENTS 8,719,109 B1 * 5/2014 Elicin .................... G06Q 30/08
705/26.2
2002/0087458 A1 * 7/2002 Yokoo .................... G06Q 40/06
705/37
2008/0082355 A1 * 4/2008 Leach .................... G06Q 40/04
705/310

(Continued)

OTHER PUBLICATIONS

Anonymous, "The History of the Secondary Ticket Market," retrieved on Mar. 4, 2021, from the Apr. 30, 2019, Internet Archive copy of https://www.clickitticket.com/the-history-of-the-secondary-ticket-market.asp (7 pages). (Year: 2019).*

(Continued)

*Primary Examiner* — Eric J. Bycer
(74) *Attorney, Agent, or Firm* — McDermott Will & Emery LLP

(57) ABSTRACT

An improved user interface is presented on a client device of a seller of an item. The improved user interface includes one or more interactive user interface elements for facilitating a listing of the item on a secondary market associated with a set of online exchange platforms. The listing of the ticket on the secondary market is simultaneous with the listing of the ticket on a primary market. A selection element provides for selecting one or more connections of the seller to whom the listing of the ticket on the secondary market is to be made accessible. Based on a determination that a connection of the one or more connections of the seller has entered into an agreement to purchase the ticket on the secondary market, the seller is charged a listing fee associated with the secondary market and the listing of the item is automatically removed from the secondary market.

20 Claims, 13 Drawing Sheets

(56) References Cited

U.S. PATENT DOCUMENTS

| | | | | |
|---|---|---|---|---|
| 2008/0208717 | A1* | 8/2008 | Suleymanov | G06Q 30/08 705/26.3 |
| 2008/0255889 | A1* | 10/2008 | Geisler | G06Q 10/02 705/5 |
| 2009/0076926 | A1* | 3/2009 | Zinberg | G06Q 30/0601 705/26.1 |
| 2010/0042477 | A1* | 2/2010 | Cavander | G06Q 10/02 705/5 |
| 2012/0078667 | A1* | 3/2012 | Denker | G06Q 30/0643 705/5 |
| 2013/0124357 | A1 | 5/2013 | He et al. | |
| 2013/0297448 | A1* | 11/2013 | Lester | G06Q 30/08 705/26.8 |
| 2014/0249870 | A1 | 9/2014 | Fineman et al. | |
| 2014/0278610 | A1* | 9/2014 | Carnahan | G06Q 10/02 705/5 |
| 2014/0278612 | A1* | 9/2014 | Carnahan | G06Q 10/02 705/5 |
| 2015/0025918 | A1* | 1/2015 | Sherman | G06Q 10/02 705/5 |
| 2016/0005012 | A1* | 1/2016 | Goetz | G06Q 20/405 705/5 |
| 2016/0180460 | A1* | 6/2016 | Rooney | G06Q 40/04 705/37 |
| 2018/0018596 | A1 | 1/2018 | Siegel | |
| 2018/0052935 | A1 | 2/2018 | Vasvani | |

OTHER PUBLICATIONS

InSearchOfRockGods, "The Ticket Industry Part One: Primary and Secondary Markets" and "The Ticket Industry Part Two: Getting Tickets Into the Hands of Fans," retrieved on Mar. 4, 2021, from https://insearchofrockgods.com/2017/11/29/ticket-industry-part-one-markets/and (Year: 2017).*

[Item V continued] https://insearchofrockgods.com/2017/11/29/ticket-industry-part-two-tickets-to-fans/, Nov. 29, 2017 (34 pages). (Year: 2017).*

Sawers, Paul, "StubHub takes on Ticketmaster with new platform for both primary and secondary tickets," Venture Beat, retrieved on Mar. 4, 2021, from https://venturebeat.com/2016/02/08/stubhub-takes-on-ticketmaster-with-new-platform-for-both-primary-and-secondary-tickets/, Feb. 8, 2016 (4 pages). (Year: 2016).*

Staff, "Stop Buying Blind—A Guide to Sports and Concert Primary Ticket Markets" and "Guide to the Secondary Market," Retrieved on Mar. 4, 2021 from https://seatgeek.com/tba/articles/primary-ticket-market-sellers/and https://seatgeek.com/tba/articles/secondary-ticket-market-and-resellers/ (Year: 2017).*

[Item U continued] part 1 originally published on May 19, 2010, part 2 originally published on Mar. 1, 2017 (20 pages). (Year: 2017).*

Written Opinion of the International Searching Authority dated Jan. 19, 2021 as received in Application No. PCT/US2020/056535, 9 pgs.

* cited by examiner

SELL TO A FRIEND

| | |
|---|---|
| ITEM: | DEADMAU5 TICKET |
| SEAT: | GENERAL ADMISSION ROW GA |
| DATE/TIME: | SAT FEB 01 2020 7:00 PM (event local time) |
| LOCATION: | NAVY PIER, CHICAGO |
| QUANTITY: | 1 ▼  OF 2 |
| PRICE: | $65.00  (LISTED AT $76.17) |
| LISTING FEE: | $ 1.50 |
| TOTAL: | $63.50 |
| RECIPIENT: | JOE@MYCONTACTS.COM  PICK . . . |
| NOTE: | DEAR JOE, HERE'S THE TICKET YOU AGREED TO PURCHASE! |

CANCEL   SELL

BUY FROM A FRIEND

| | |
|---|---|
| ITEM: | DEADMAU5 TICKET |
| SEAT: | GENERAL ADMISSION ROW GA |
| DATE/TIME: | SAT FEB 01 2020 7:00 PM (event local time) |
| LOCATION: | NAVY PIER, CHICAGO |
| QUANTITY: | 1 |
| 1102 — PRICE: | $65.00  (LISTED AT $76.17) |
| 1104 — PAYMENT: | PAYPAL        PICK... — 1106 |
| SELLER: | ADAM@MYCONTACTS.COM |

CANCEL     BUY

*FIG. 11*

USER INTERFACES FOR MANAGING LISTINGS IN A SECONDARY MARKETPLACE

TECHNICAL FIELD

The present application relates generally to the technical field of user interfaces, and, in one specific example, to an improved user interface for managing listings across a set of marketplaces associated with a set of online exchange platforms.

BACKGROUND

A network-based publication system, including online exchange systems, such as eBay™, Amazon.com™, Craigslist™, or StubHub™ may feature listings of items (e.g., goods or services). The listings may be posted by a member of the network-based publication system (e.g., a seller) and surfaced via one or more user interfaces to other members or users of the network-based publication system (e.g., potential buyers). User interfaces for such systems have some deficits relating to efficient functioning of the computer. For example, managing listings across a set of online exchange system may require a seller to access different domains or systems, drill down through many layers of views, or use different user interface paradigms to access desired data or functionality. Additionally, various marketplaces existing within or associated with a set of one or more online exchange platforms may be difficult to find or access.

BRIEF DESCRIPTION OF THE DRAWINGS

Some embodiments are illustrated by way of example and not limitation in the figures of the accompanying drawings.

FIG. 9 is a diagram depicting an example user interface for specifying terms of an offer for selling an item to a friend on a secondary marketplace.

FIG. 11 is a diagram depicting an example user interface for accepting an offer for a sale of an item on a secondary marketplace.

DETAILED DESCRIPTION

Figure 1:
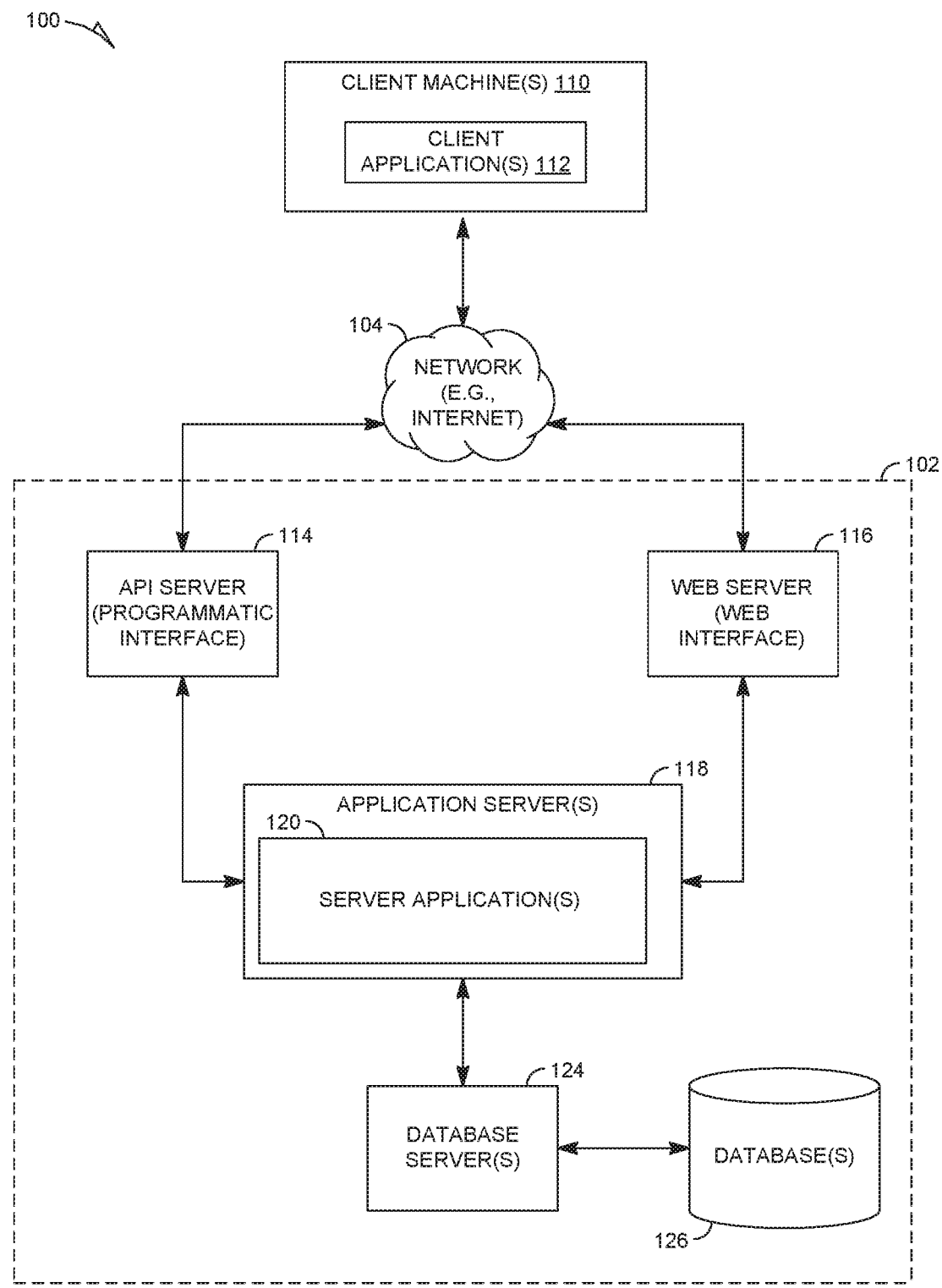
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

Some sellers may recognize the viewing public on those marketplaces that come across their listing and seek to make a sale to that party through the marketplace on a "semi-private" basis.

In example embodiments, a method of generating and providing an improved user interface for facilitating transactions pertaining to a listing of an item on one or more online exchange platforms is disclosed. It is determined that the listing of the item has been listed on a primary market associated with the one or more online exchange platforms. The listing of the item is associated with a first price and a first listing fee. The improved user interface is generated and presented on a client device of a seller of the item, the improved user interface including one or more interactive user interface elements for facilitating a listing of the item on a secondary market associated with the one or more online exchange platforms. The one or more interactive user interface elements include a selection element for selecting one or more connections of the seller to whom the listing of the item on the secondary market is to be made accessible. The listing of the item on the secondary market is associated with a second price and a second listing fee. The secondary market is reserved for the seller of the item and the selected one or more connections of the seller. The listing of the item on the secondary market is simultaneous with the listing of the item on the primary market. Based on a determination that a connection of the set of connections of the seller has entered into an agreement to purchase the item on the secondary market, the seller is charged the second listing fee and listing is automatically removed from the secondary market. In example embodiments, the item is a ticket and the online exchange platform is online ticket exchange platform that is specially-configured to facilitate transactions relating to tickets.

The methods and various operations disclosed herein may be implemented as a computer system having one or more modules (e.g., hardware modules or software modules) that are specially designed and incorporated into the computer system to perform these methods or one or more of the operations described herein. These methods and various operations disclosed herein may be embodied as instructions stored on a machine-readable medium that, when executed by a machine, cause the machine to perform the method or one or more of the various operations.

The methods and various operations disclosed herein provide specific improvements over prior art systems, including, for example, improving the efficiency of using one or more electronic devices by bringing together a limited list of common functions and commonly access stored data, which, in various embodiments, can be accessed directly from a home page or profile page associated with a user of the one or more online exchange platforms. The methods provide for the ability to create a private, temporary market or marketplace within a marketplace between two users until a sale completes or an inactivity period elapses. The user may be able to view various data about listings posted on a set of marketplaces associated with a set of online exchange system in one place without having to navigate separately to each of the marketplaces or each of the online exchange platforms, thus saving the user time, including with respect to one or more electronic devices with small screens.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft™ Corporation of Redmond, Wash. or other application supported by an operating system of the device, such as Windows™, iOS™ or Android™ operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application (s) 120. The application servers 118 are, in turn, shown to be coupled to one or more database servers 124 that facilitate access to one or more databases 126 or data stores, such as NoSQL™ or non-relational data stores.

The server applications 120 may provide a number of marketplace functions and services to users that access the networked system 102. While the server applications 120 are shown in FIG. 1 to form part of the networked system 102, in alternative embodiments, the various server applications 120 may form part of a service that is separate and distinct from the networked system 102.

Further, while the system 100 shown in FIG. 1 employs a client-server architecture, various embodiments are, of course, not limited to such an architecture, and can equally well find application in a distributed, or peer-to-peer, architecture system, for example. The various server applications 120 can also be implemented as standalone software programs, which do not necessarily have networking capabilities. Additionally, although FIG. 1 depicts client machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal™, Visa™, MasterCard™, and American Express™).

Web applications executing on the client machine(s) 110 may access the various server applications 120 via the web interface supported by the web server 116. Similarly, native applications executing on the client machine(s) 110 may access the various services and functions provided by the server applications 120 via the programmatic interface provided by the API server 114. An example of one of the client application(s) 112 may be a seller application (e.g., the TurboLister application developed by eBay Inc., of San Jose, Calif.) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace, or payment functions that are supported by the relevant applications of the networked system 102.

Figure 2:
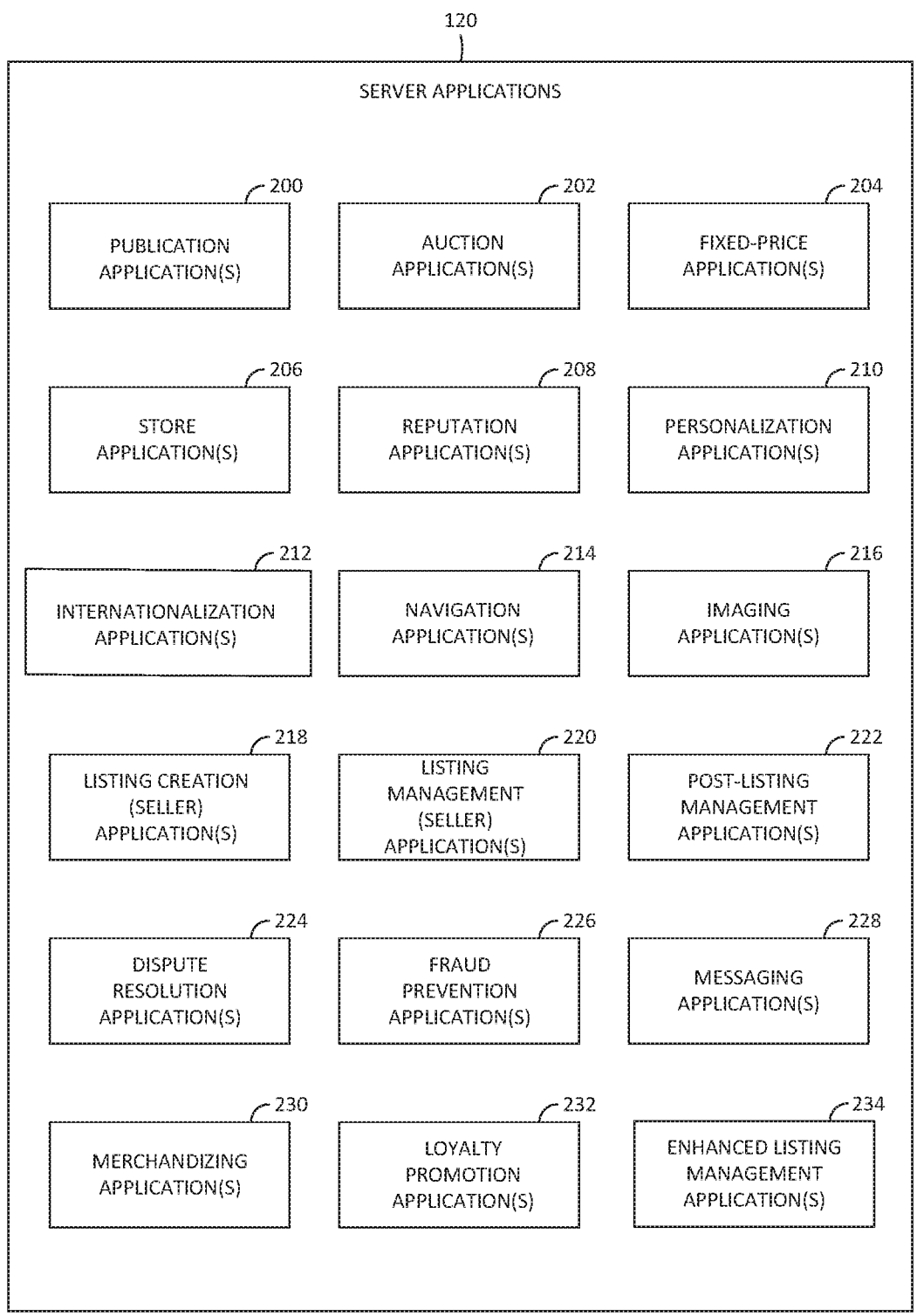
FIG. 2 is a block diagram illustrating multiple server applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 so as to allow the server applications 120 to share and access common data. The server applications 120 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction. Second chance offers provide similar functionality to those users who did not win an auction when a seller chooses to sell to them directly when the winning bidder cannot complete the payment post "win."

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users that transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the server applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors) to assist the seller in managing such listings. The listing creation application 218 and listing management applications 220 may allow sellers to manage listings in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular or predetermined buyer. To this end, a post-listing management application 222 may provide an interface to one or more reputation applications 208, so as to allow the seller to conveniently provide feedback regarding multiple buyers to the reputation applications 208. A seller may also wish to de-duplicate listings across marketplaces once the sale of the last quantity of a good has been spoken for by a buyer to avoid being unable to fulfill a purchase.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular or predetermined seller, and may be offered a reward for which accumulated loyalty points can be redeemed.

Enhanced listing management application(s) 234 may include one or more applications for enhancing a listing user interface (e.g., for one or more of the listing creation applications 218, listing management applications 220, or post-listing management applications 222) with one or more user elements for managing a listing on one or more marketplaces associated with one or more online exchange platforms, including a primary marketplace and a secondary marketplace, as described in more detail below.

Figure 3:
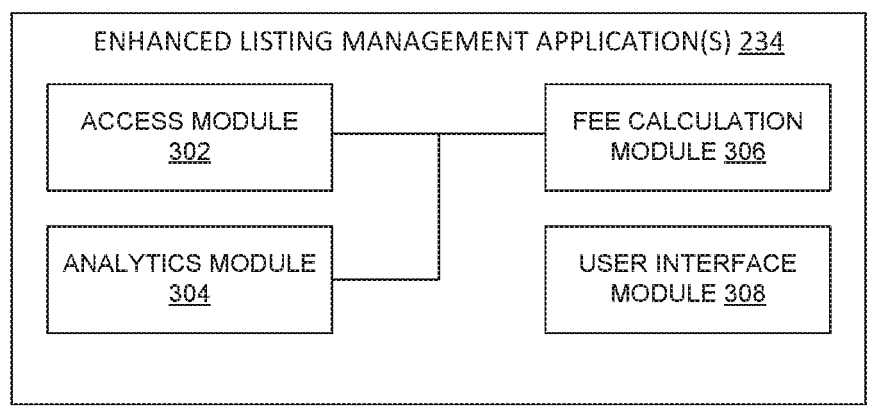
FIG. 3 is a block diagram illustrating example modules of the enhanced listing application(s) of FIG. 2.

FIG. 3 is a block diagram illustrating example modules of the enhanced listing management application(s) 234. An access module 302 is configured to determine one or more conditions under which a user is granted access to the secondary market and whether those conditions are satisfied. An analytics module 304 is configured to monitor transactions and behaviors of users over time and determine their value (e.g., with respect to retention or future generation of revenues) or interest in engaging in transactions with respect to the one or more online exchange markets. A fee calculation module 306 is configured to determine appropriate fees (e.g., listing or transaction fees) to offer to users who choose to use the secondary marketplace to sell one or more items. A user interface module 308 is configured to generate and communicate any of the user interfaces described herein (e.g., for presentation on client devices of users).

Figure 4:
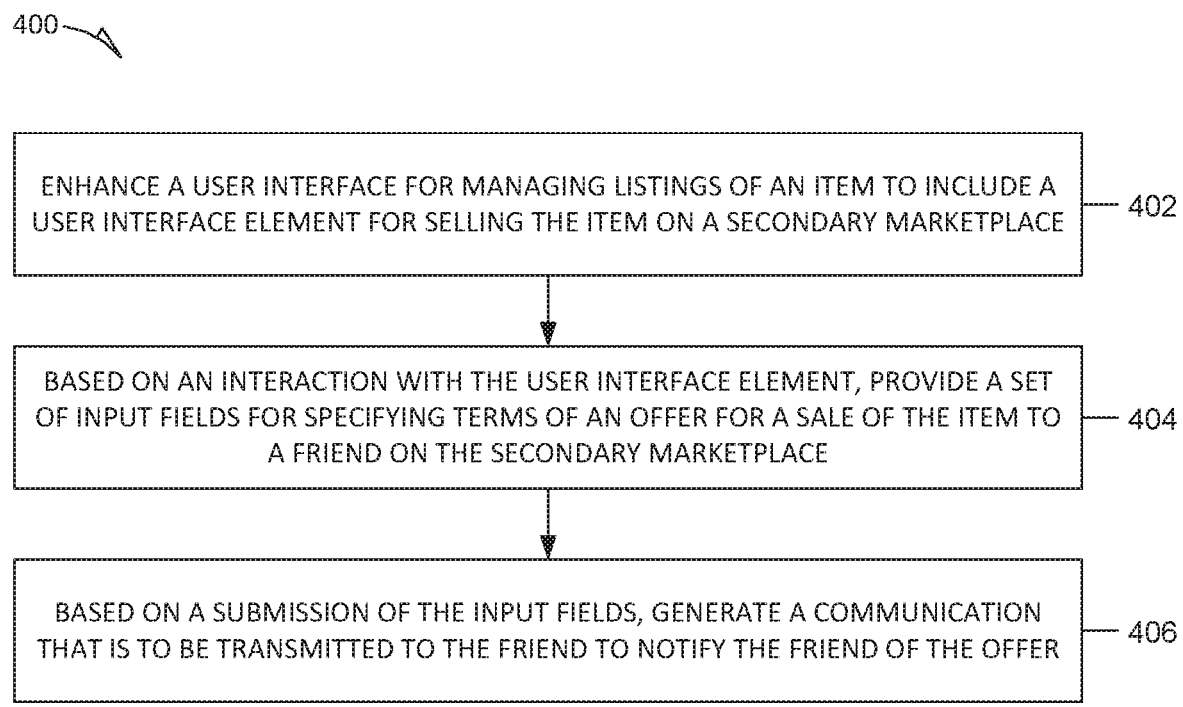
FIG. 4 is a flowchart illustrating example operations of a method of providing a seller with access to a secondary marketplace for selling of an item.

FIG. 4 is a flowchart illustrating example operations of a method 400 of providing a seller with access to a secondary marketplace for selling of an item. In example embodiments, the operations may be performed by one or more modules of the enhanced listing management application(s) 234.

At operation 402, a managing user interface for managing listings of an item is enhanced to include a user interface element (e.g., a "Sell to a Friend" button) for selling the item on a secondary marketplace. In example embodiments, the secondary marketplace may be reserved for transactions between a seller of the item and friends of the seller. In example embodiments, friends of the seller may include people to whom the seller has established a connection via one or more social networks of the seller. In example embodiments, the item may or may not already be listed on a primary marketplace in addition to the secondary marketplace.

The primary marketplace may be a marketplace that is not reserved for transactions between the seller and friends of the seller. For example, the primary marketplace may be open to the general public or to a set of members of one or more online exchange platforms independently of any relationships the members have with the seller.

In example embodiments, the managing user interface may be a dashboard page associated with the one or more online exchange platforms. The dashboard page may include an inventory of items that the seller has previously purchased via the one or more online exchange platforms or otherwise included as being available for listing with respect to the one or more online exchange platforms.

In example embodiments, the including of the user interface element for selling the item on the secondary market may be based on the seller satisfying one or more requirements for accessing the sell-to-a-friend feature. Such requirements may include that the seller has not used the feature for a predetermined or configurable amount of time (e.g., for 12 months). In example embodiments, when the seller does not satisfy the requirements, information may be presented in the user interface pertaining to when the user interface element will next be available for the seller to access. In example embodiments, the amount of time may be calculated periodically based on a value of retaining the seller as a user of one or more of the online exchange systems, as explained in more detail below. In example embodiments, various actions may trigger this amount of time to be reduced, such as actions that increase the value of retaining the seller. Such actions may include engaging in more transactions with respect to the one or more online exchange platforms so as to increase a number of transactions fees collected by the one or more online exchange platforms. In example embodiments, suggested actions for reducing the amount of time may be communicated to the seller in the user interface to incentivize the seller to engage in those actions.

In example embodiments, managing user interface may be supplemented with one or more indicators pertaining to a demand within the secondary market for one or more items in the inventory of the seller. For example, behavior of friends of the seller may be monitored to gauge their interest in items included in the inventory of the seller (e.g., based on number of views by friends of the seller of the same or similar items included in the inventory of the seller). Items having an interest level that exceeds a threshold level of interest among friends of the seller (e.g., that are outside a predetermined normal range of interest) may thus be identified as potential candidates for selling on the secondary market.

At operation 404, based on an interaction with the user interface element, an offer user interface is generated, by the user interface module 308, for specifying terms of an offer for a sale of the item on the secondary marketplace. In example embodiments, the offer user interface includes one or more input fields for specifying a quantity and/or a price of the item. In example embodiments, the offer user interface may include fields for specifying how payment of a listing fee for listing the item on the secondary market is to be divided between the seller and the friend to whom the offer is being made. In example embodiments, the listing fee for listing the item on the secondary market may be a predetermined or fixed amount that is less than a listing fee for listing the item on the primary market (e.g., provided as an incentive for the user to engage in additional transactions with respect to the one or more online exchange platforms). In example embodiments, the listing fee for the listing of the item on the secondary market may be calculated based on a value of retaining the seller as a user of the one or more online exchange systems, as explained in more detail below.

In example embodiments, the offer user interface includes one or more fields to allow the seller to identify the friend by, for example, entering contact information associated with the friend, such as an email address, a phone number, and so on. In example embodiments, a picker user interface element may be provided to allow the seller to identify the friend by selecting the friend from a list of known connections of the seller.

In example embodiments, the offer user interface includes a field for specifying a note that is to be communicated to the friend in connection with the offer to sell the item.

In example embodiments, the offer user interface includes one or more user interface elements for submitting or cancelling the offer (e.g., "Cancel" "Cancel all" or "Sell" buttons).

At operation 406, based on a submission of the offer user interface, including the content entered into the fields of the offer user interface, a communication is generated that is transmitted to the friend of the seller to notify the friend of the offer to sell the item on the secondary marketplace. In example embodiments, the notification includes a summary of the terms of the offer and an activatable link for completing a transaction pertaining to the offer. In example embodiments, natural language processing is used to present the offer in a textual form when communicated to the friend (e.g., for presentation in a chat application).

Figure 5:
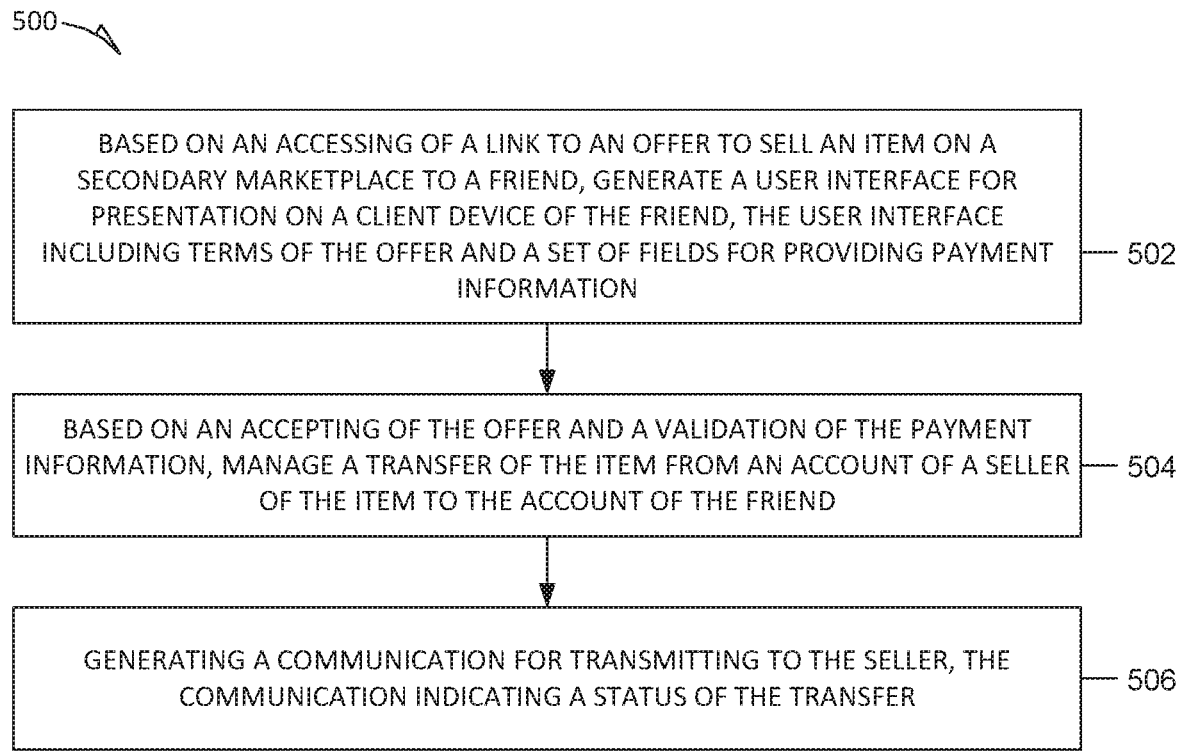
FIG. 5 is a flowchart illustrating an example method of providing a friend of a seller with access to an offer to sell an item on a secondary marketplace.

FIG. 5 is a flowchart illustrating an example method 500 of providing a friend of a seller with access to an offer to sell an item on a secondary marketplace. In example embodiments, the operations may be performed by one or more modules of the enhanced listing management application(s) 234.

At operation 502, an acceptance user interface is generated by the user interface module 308. In example embodiments, an indication of an interest in a friend of a seller in completing a transaction associated with an offer made to the user is detected. For example, it is determined that the friend has clicked on a link included in a notification of the offer that was communicated to the friend. In response to the detection of the interest, the acceptance user interface is generated for communication to and presentation on a client device of the friend. The acceptance user interface may include information pertaining to the terms of the offer and a set of fields for the friend to provide payment information (e.g., credit card number or PayPal™ authorization). The acceptance user interface is then transmitted to the client device of the friend for display.

At operation 504, based on an accepting of the terms of the offer and a validation of the payment method provided by the friend, the item is transferred from an account of the seller to an account of the friend or shipping of the item is initiated (e.g., for fulfillment by the seller via a selected shipping method). Additionally, payment for the item is transferred from an account of the friend to an account of the seller. In example embodiments, one or more listing and or transaction fees are deducted from one or more of the accounts of the friend and the account of the seller and credited to one or more accounts associated with the one or more online exchange platforms. In example embodiments, the seller controls (e.g., through the terms of the offer) responsibility of each of the parties with respect to the payment of any fees.

At operation 506, one or more communications pertaining to the transaction are generated for transmitting to the seller or the friend. For example, upon acceptance of the offer and validation of the payment information, the seller may be notified that the friend has completed the purchase for the item, funds have been transferred into the seller's account, and that the item that is the subject of the transaction has been transferred to the friend's account. Similarly, the buyer may be notified that the item that is the subject of the transaction has been transferred into their account (the account of the friend) and that an account for making the corresponding payment has been charged.

Figure 6:
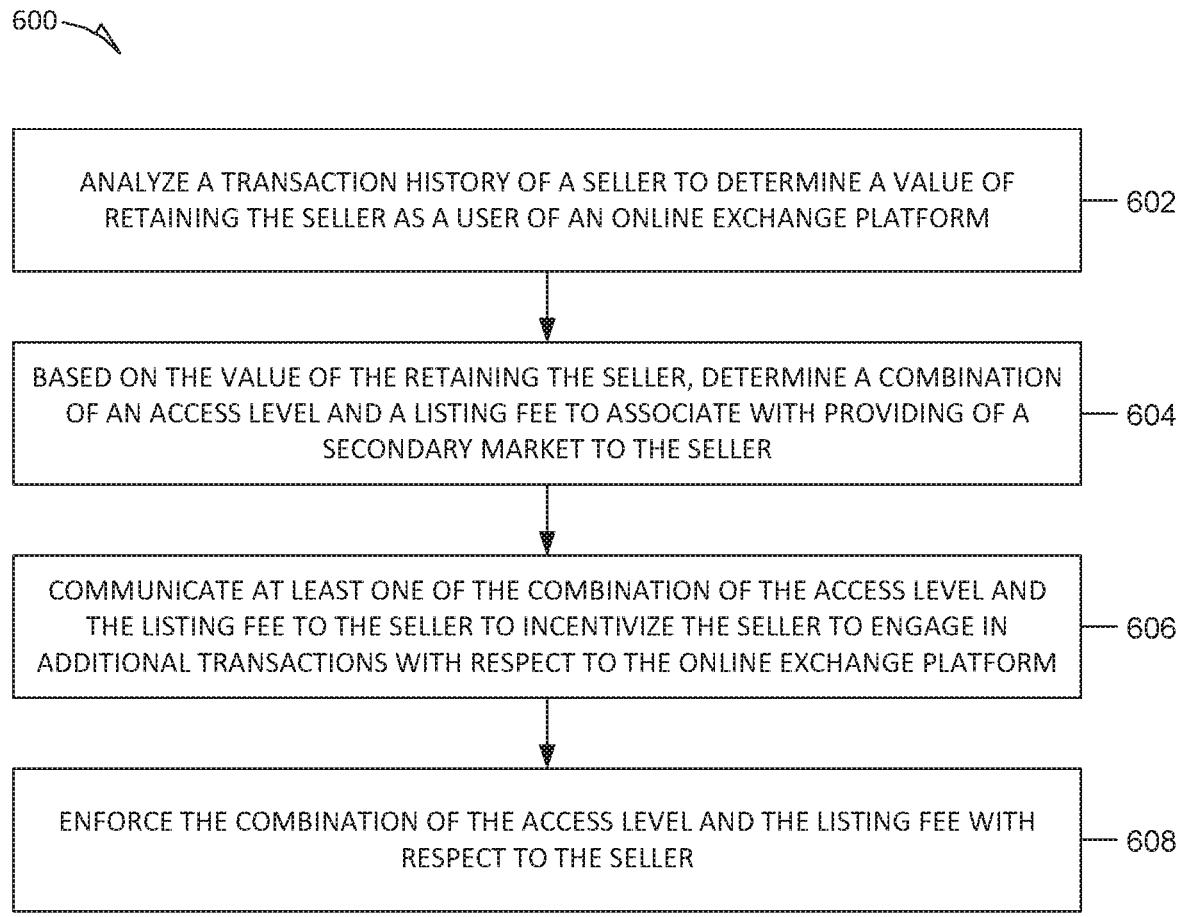
FIG. 6 is a flowchart illustrating an example method of controlling access of a seller or charging a seller with an appropriate fee to use the sell-to-a-friend feature of an online exchange platform.

FIG. 6 is a flowchart illustrating an example method 600 of controlling access of a seller or charging a seller with an appropriate fee to use the sell-to-a-friend feature of an online exchange platform (e.g., via the secondary marketplace). In example embodiments, the operations may be performed by one or more modules of the enhanced listing management application(s) 234, in particular, the access module 302 and the analytics module 304.

At operation 602, a transaction history of a seller is analyzed to determine a value of retaining the seller as a user of one or more online exchange platforms. For example, a number or amount of transaction fees associated with transactions engaged in by the seller may be aggregated over a particular time period (e.g., the last 12 months).

At operation 604, based on the value of the retaining of the seller, a combination of an access level and a listing fee to associate with providing of a secondary market to the seller for selling of an item is determined. For example, it may be determined that the seller should be offered an option to sell an item on the secondary market for a fixed price once per month or once per year. The fixed price may be determined to be a discounted price relative to the cost of selling the item on the primary market. Thus, in example embodiments, a user may be more willing to purchase an item on the primary market knowing that the user can sell the item at a fixed discounted price on the secondary market later, if necessary. In example embodiments, a listing fee may be reduced (e.g., as a percentage) relative to a fee associated with the listing of the item on the primary market. The amount of the reduction may be based on a cost of the lost transaction fee associated with selling of the item on a primary market in comparison with an expected increase in activity by the user with respect to the one or more online exchange platforms based on the sell-to-a-friend feature being made available to the user on the secondary marketplace.

At operation 606, at least one of the combination of the access level and the listing fee are communicated to the seller (e.g., to incentivize the seller to engage in additional transactions with respect to the online exchange platform). For example, upon access a dashboard or profile page, the seller may be presented with information pertaining to how much time the user must wait until the sell-to-a-friend feature becomes active or how much cheaper listing fee would be for a listing of the item via the secondary marketplace in comparison to a listing fee on the primary marketplace. Additionally, one or more interactive user interface elements may be provided to allow the seller to perform a task that would shorten the waiting period or lower the listing fee, or both, by a specified predesignated or configurable amount (e.g. per action). Thus, for example, as a seller becomes more valuable (e.g., as described herein), the sell-to-a-friend feature may become more accessible or offer more savings to the seller.

At operation 608, the combination of the access level and the listing fee are enforced with respect to the seller. Thus, for example, the sell-to-a-friend feature may become accessible only when one or more predesignated or configurable criteria are met, such as an elapsing of a time period since the feature was last used, a taking of an action by the seller (e.g., such as generating an amount of listing or transactions fees sufficient to unlock the feature), and so on.

In example embodiments, various predetermined or configurable values and thresholds discussed herein may be specified or modified by an administrator via an administrative user interfaces. In example embodiments, the predetermined or configurable values may be modified (e.g., via machine-learning) and updated values reflected in the administrative and other user interfaces described herein. For example, machine-learning may be applied to determine the impact of various combinations of access levels and listing fees for the sell-to-a-friend feature on the value of a seller. Thus, optimal combinations for generating additional transaction fees and listing fees may be calculated and offered to a particular seller based on the machine-learned combinations.

Figure 7:
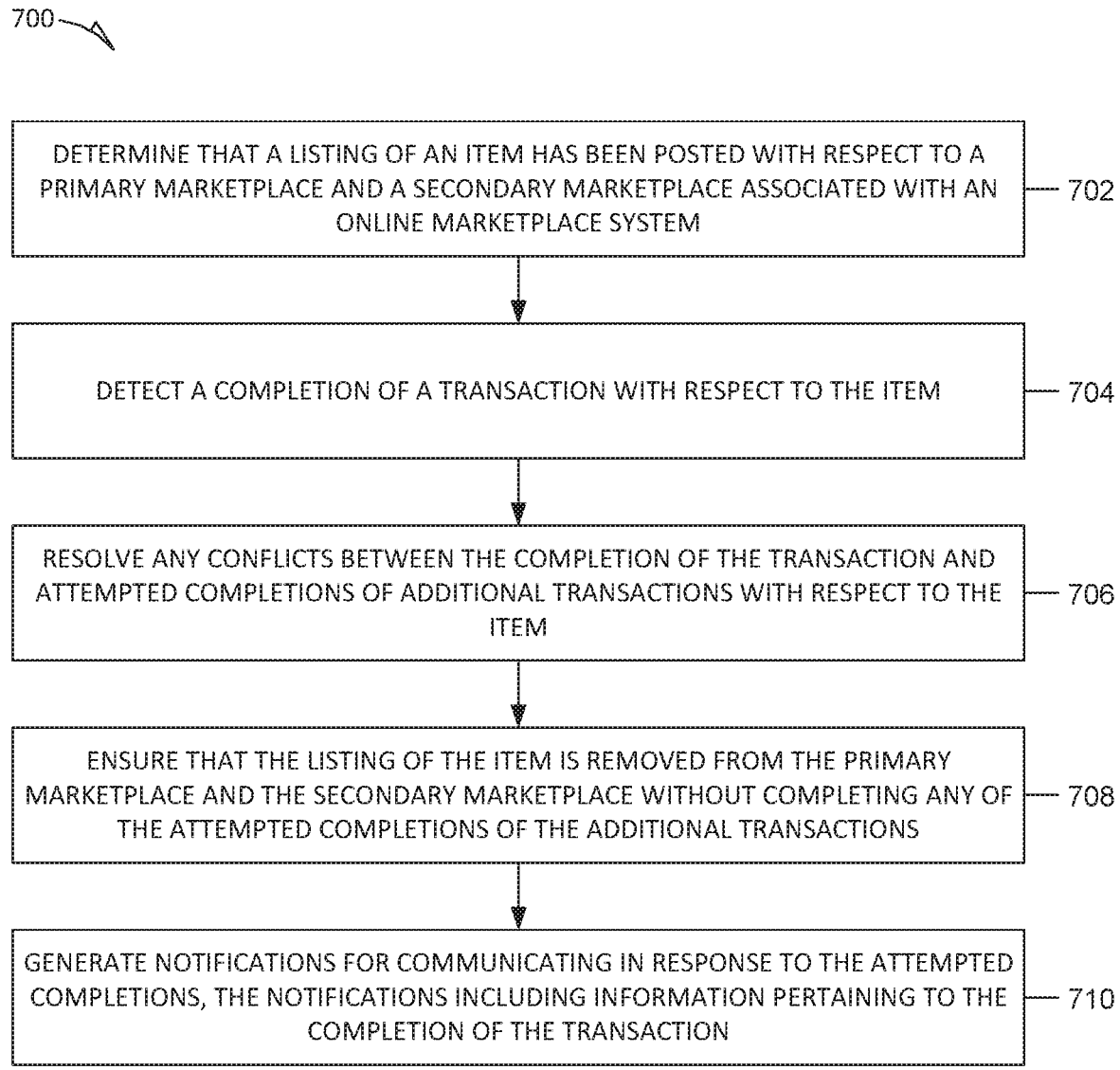
FIG. 7 is a flowchart illustrating an example method of handling multiple attempts to complete a transaction with respect to a listing of an item.

FIG. 7 is a flowchart illustrating an example method 700 of handling multiple attempts to complete a transaction with respect to a listing of an item. In example embodiments, the operations may be performed by one or more modules of the enhanced listing management application(s) 234.

At operation 702, it is determined that a listing of an item has been posted with respect to a primary marketplace and a secondary marketplace associated with one or more online exchange platforms.

At operation 704, it is detected that a transaction has been completed with respect to the item.

At operation 706, any conflicts between the completion of the transaction and attempted completions of additional transactions with respect to the same item are resolved. In example embodiments, for any transaction completed on the secondary market, a pending charge is made to an account of the buyer (e.g., the friend of the seller) before a final charge is made to the account of the buyer. After a predetermined time has elapsed (e.g., two seconds), if no other payment is made for the purchasing of the item (e.g., via a primary marketplace of the one or more online exchange platforms), the transaction is finalized with respect to the secondary market and the amount of the transaction is charge to the account of the buyer.

At operation 708, it is ensured that listings for an item that has been sold (and for which the sales transaction has been completed) are removed across a set of marketplaces without allowing any attempted completions of additional transactions. For example, attempted completions of a transaction pertaining to transaction that are accessed by an outdated link (e.g., such as for a first offer that precedes a second offer for the same item that is made to a different friend of the seller) are redirected such that the would-be buyer is notified of the other sale and prevented from completing the transaction.

At operation 710, notifications are generated for communicating in response to any additional attempt completions. The notifications may include one or more details pertaining to the completed transaction. Thus, users who attempt to use a link for completing an offer for a sale on a secondary market, but who do not act in time, will be notified of the offer that they missed, and are thus incentivized to act more quickly to respond to such offers in the future. Furthermore, these users may be shown marketplace listings similar to the item they just missed purchasing in the private sale.

Figure 8:
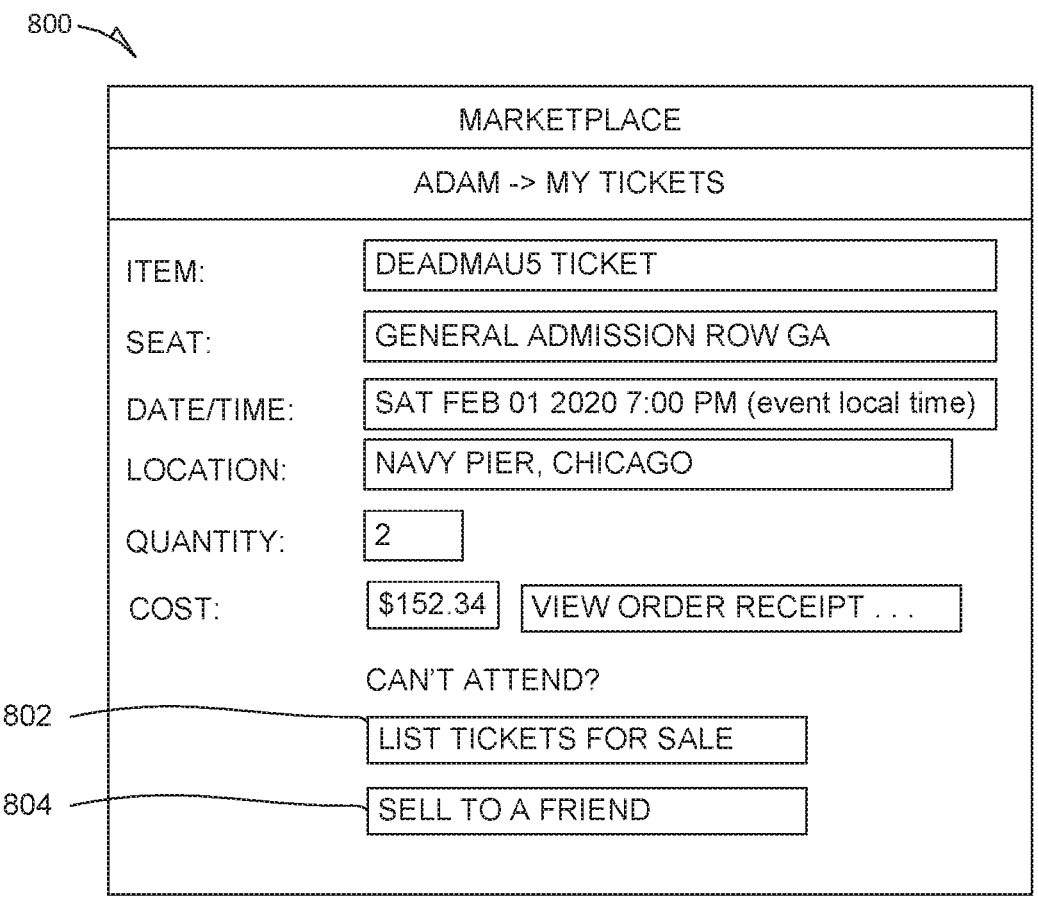
FIG. 8 is a diagram depicting an example user interface for listing an item for sale on a primary marketplace or a secondary marketplace.

FIG. 8 is a diagram depicting an example user interface 800 for listing an item for sale on a primary marketplace or a secondary marketplace. In example embodiments, the user interface 800 may be generated and communicated to a client device for presenting on the client device by one or more modules of the enhanced listing management application(s) 234. As depicted, the user interface 800 includes information identifying the item, a quantity for the item, and a cost or value of the item (e.g., based on an order receipt generated upon the purchasing of the item by a user). In example embodiments, a first user interface element 802 is provided for listing the item for sale on a primary market and a second user interface element 804 (e.g., a "SELL TO A FRIEND" button) is provided to allow the user to invoke the sell-to-a-friend feature to sell an item on a secondary market. In example embodiments, this second user interface element is provided conditionally upon the user satisfying one or more criteria for accessing the sell to-a-friend feature, as discussed herein.

FIG. 9 is a diagram depicting an example user interface 900 for specifying terms of an offer for selling an item to a friend on the secondary marketplace. In example embodiments, the user interface 900 may be generated and communicated to a client device for presenting on the client device by one or more modules of the enhanced listing management application(s) 234. As depicted, the user interface 900 includes dynamic user interface elements 902, 904, 906, 908, 910, 912, for specifying a quantity, price, listing fee, a recipient, and note (e.g., from the seller to the potential buyer), respectively. These fields may be supplemented with additional information, such as a total quantity of items in an inventory of the seller, a price at which the item is currently listed (e.g., on a primary marketplace). In example embodiments, the user interface element 906 may include or be associated with options for specifying a portion of the listing fee to be paid by each party to a transaction (e.g., the buyer and seller), as discussed herein. As depicted, the user interface 900 assumes, for example, that the seller is responsible for the entire listing fee.

Figure 10:
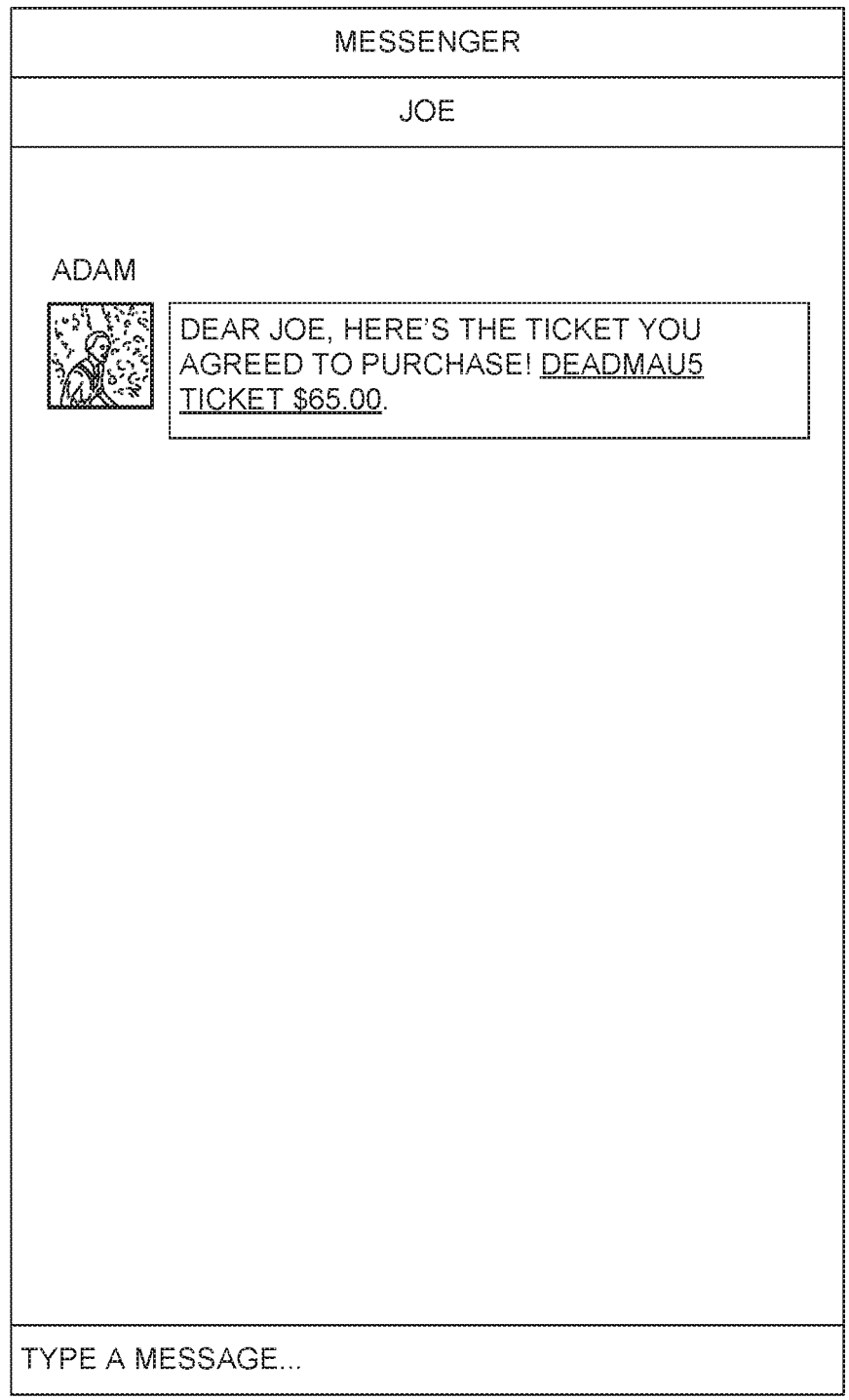
FIG. 10 is a diagram depicting an example user interface for communicating to a friend of a seller the terms of an offer to sell an item on a secondary marketplace.

FIG. 10 is a diagram depicting an example user interface 1000 for communicating to a friend of a seller the terms of an offer to sell an item on a secondary marketplace. In example embodiments, the user interface 1000 may be generated and communicated to a client device for presenting on the client device by one or more modules of the enhanced listing management application(s) 234. As depicted, the friend to whom the offer is communicated receives a text message via a messaging application that provides a link for completing a transaction pertaining to the offer.

FIG. 11 is a diagram depicting an example user interface 1100 for accepting an offer for a sale of an item on a secondary marketplace. In example embodiments, the user interface 1100 may be generated and communicated to a client device for presenting on the client device by one or more modules of the enhanced listing management application(s) 234. As depicted, the user interface 1100 includes the terms of the offer (e.g., as specified by the seller), including the price 1102 (e.g., $65), and user interface elements 1104 and 1106 for specifying or picking a payment method from a plurality of supported payment methods (e.g., PayPal™ or credit card information).

Figure 12:
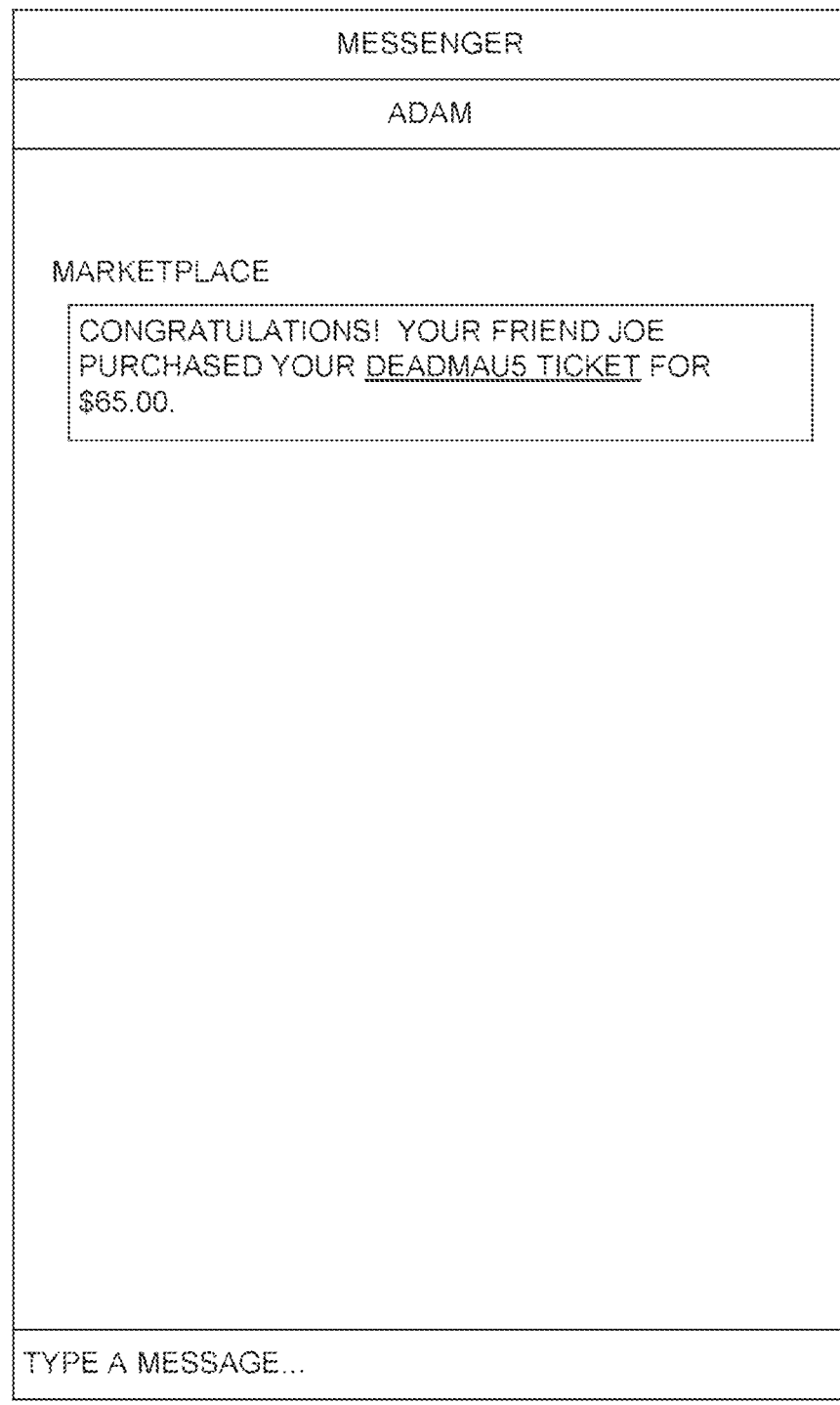
FIG. 12 is a diagram depicting an example user interface for communicating a completion of a transaction pertaining to an item listed on a secondary marketplace.

FIG. 12 is a diagram depicting an example user interface 1200 for communicating a completion of a transaction pertaining to an item listed on a secondary marketplace. In example embodiments, the user interface 1200 may be generated and communicated to a client device for presenting on the client device by one or more modules of the enhanced listing management application(s) 234. As depicted, the user interface 1200 may include a text message transmitted to the seller indicating an acceptance by a friend of an offer to sell an item via the secondary marketplace.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 13:
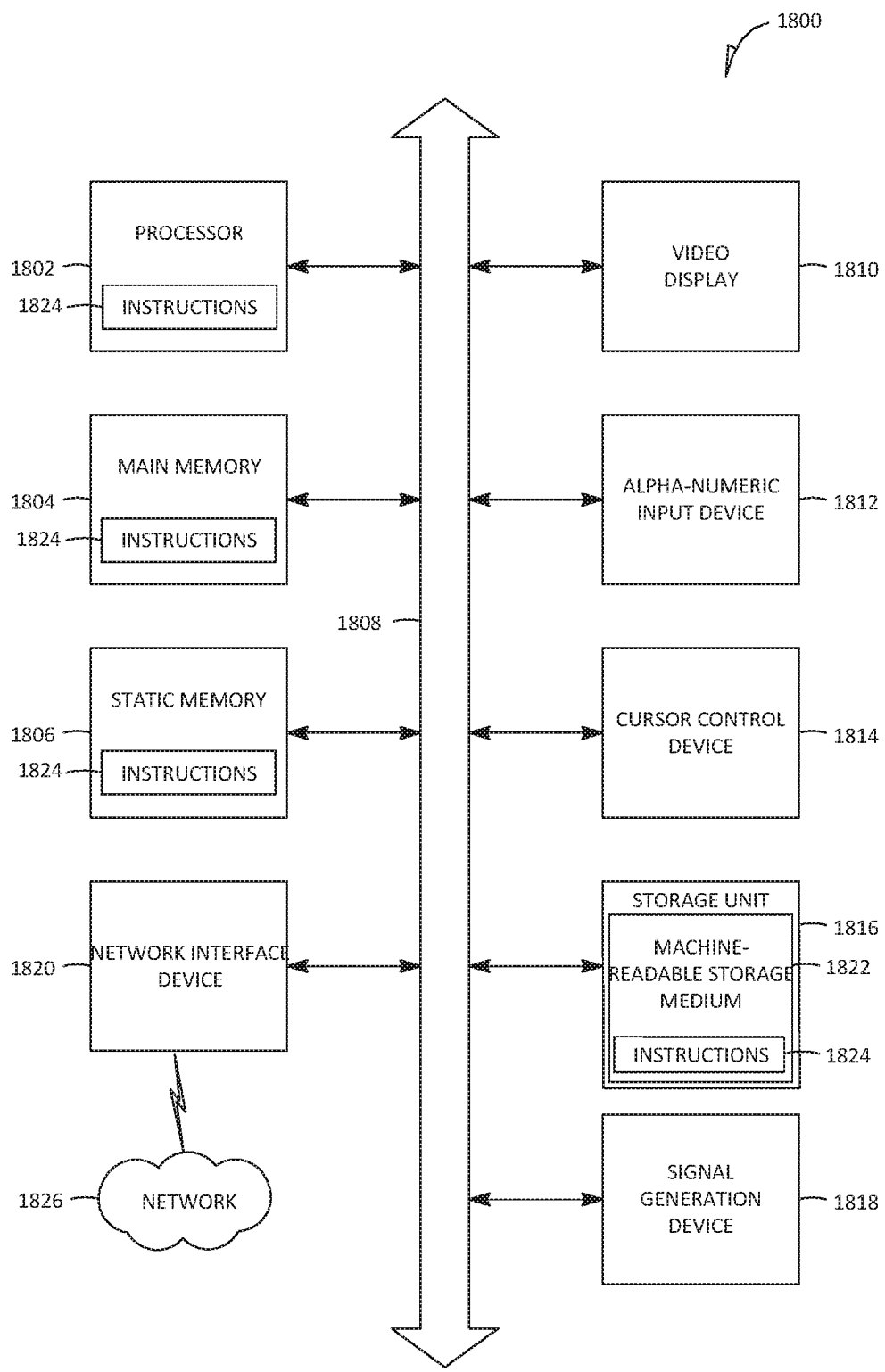
FIG. 13 is a block diagram of machine in the example form of a computer system within which instructions for causing the machine to perform any one or more of the methodologies discussed herein may be executed.

FIG. 13 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable storage medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable storage medium 1822 is shown in an example embodiment to be a single medium, the term "machine-readable storage medium" may include a single medium or multiple media (e.g., a centralized or distributed database, and/or associated caches and servers) that store the one or more instructions 1824 or data structures. The term "machine-readable storage medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable storage medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable storage medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable storage medium 1822 is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   identifying a listing of a ticket on a primary market associated with an online ticket exchange platform, the listing of the ticket being associated with a first price and a first fee;
   presenting an improved user interface on a client device of a seller, the improved user interface including one or more interactive user interface elements for facilitating a listing of the ticket on a secondary market associated with the online ticket exchange platform, the one or more interactive user interface elements including a selection element for selecting multiple connections to whom the listing of the ticket on the secondary market is to be made accessible, the listing of the ticket on the secondary market being associated with a second price, the secondary market being reserved for the seller of the ticket and the connections, the listing of the ticket on the secondary market is displayed until a predetermined time has elapsed after at least one ticket was displayed on the secondary market, and the seller generates an amount of transactions higher than a predetermined value; and
   based on a determination that a connection of the seller has entered into an agreement to purchase the ticket on the secondary market, charging the seller a second fee and automatically removing the listing of the ticket from the secondary market, and sending a notification to other connections that they have a missed offer, including the first price and a listing similar to the missed offer.

2. The method of claim 1, further comprising based on a determination that a user of the online ticket exchange platform has entered into an agreement to purchase the ticket on the primary market, automatically handling removing of the listing of the ticket from the primary market.

3. The method of claim 1, wherein the second fee in the secondary market is less than the first fee and presenting the improved user interface is based on one or more criteria, the criteria including that a number tickets sold by the seller is less than a threshold number.

4. The method of claim 1, wherein the first fee is a percentage of the first price and the second fee in the secondary market is a fixed fee.

5. The method of claim 1, wherein the second fee in the secondary market is calculated based on historical transaction data pertaining to a measure of user loyalty.

6. The method of claim 1, further comprising determining a demand for the ticket and wherein presenting the improved user interface is based on the demand exceeding a demand threshold.

7. The method of claim 1, further comprising presenting an additional user interface to a connection, the additional user interface including one or more interactive user interface elements for facilitating a selection of the ticket as a candidate ticket to make accessible to the connection; and wherein presenting the improved user interface is based on the selection of the ticket as the candidate ticket by a connection.

8. A system comprising:
one or more computer processors; one or more computer memories; and
a set of instructions stored on the one or more computer memories, the set of instructions configuring the one or more computer processors to perform operations comprising:
determining that a listing of a ticket has been listed on a primary market associated with an online ticket exchange platform, the listing of the ticket being associated with a first price;
presenting an improved user interface on a client device of a seller, the improved user interface including one or more interactive user interface elements for facilitating a listing of the ticket on a secondary market associated with the online ticket exchange platform, the one or more interactive user interface elements including a selection element for selecting multiple connections to whom the listing of the ticket on the secondary market is to be made accessible, the listing of the ticket on the secondary market being associated with a second price, the secondary market being reserved for the seller of the ticket and the connections when a predetermined time has elapsed after at least one ticket was displayed on the secondary market, and the seller generates an amount of transactions higher than a predetermined value, the listing of the ticket on the secondary market to at least partially overlap with the listing of the ticket on the primary market; and
based on a determination that a connection of the connections has entered into an agreement to purchase the ticket on the secondary market, charging the seller a second listing fee and automatically removing the listing of the ticket from the secondary market, and sending a notification to other connections that they have a missed offer, including the first price and a listing similar to the missed offer.

9. The system of claim 8, the operations further comprising, based on a determination that a user of the online ticket exchange platform has entered into an agreement to purchase the ticket on the primary market, automatically handling removing of the listing of the ticket from the primary market.

10. The system of claim 8, wherein the second listing fee is less than the first price and presenting an improved user interface on a client device of a seller is based on one or more criteria, the criteria including that a number of tickets sold by the seller is less than a threshold number.

11. The system of claim 8, wherein the first price is a percentage of a first sales price.

12. The system of claim 11, wherein the second price is calculated based on historical transaction data pertaining to a measure of user loyalty.

13. The system of claim 11, the operations further comprising determining a demand for the ticket and wherein presenting an improved user interface on a client device of a seller is based on the demand exceeding a demand threshold.

14. The system of claim 8, the operations further comprising presenting an additional user interface on a client device of a connection, the additional user interface including one or more interactive user interface elements for facilitating a selection of the ticket as a candidate ticket to make accessible to the connection; and wherein presenting an improved user interface on a client device of a seller is based on the selection of the ticket as the candidate ticket by a connection.

15. A non-transitory, computer-readable storage medium storing multiple instructions that, when executed by a computer processor, cause a computer to perform:
identifying, on a primary market, a listing of a ticket, the listing of the ticket being associated with a one or more online ticket exchange platforms, the listing of the ticket being associated with a first price and;
presenting an improved user interface on a client device of a seller of the ticket, an improved user interface, the improved user interface including one or more interactive user interface elements for facilitating a listing of the ticket on a secondary market when a predetermined time has elapsed after at least one ticket was displayed on the secondary market, and the seller generates an amount of transactions higher than a predetermined value, the secondary market being associated with the one or more online ticket exchange platforms, the one or more interactive user interface elements including a selection element for selecting multiple connections to whom the listing of the ticket on the secondary market is to be made accessible, the listing of the ticket on the secondary market being associated with a second price, the secondary market being reserved for the seller of the ticket and the connections, the listing of the ticket on the secondary market to at least partially overlap with the listing of the ticket on the primary market; and
based on a determination that a connection from multiple connections of the seller has entered into an agreement to purchase the ticket on the secondary market, charging the seller a second listing fee and automatically removing the listing of the ticket from the secondary market, and sending a notification to the connections of the seller that they have missed an offer, including the first price and a listing similar to the offer that was missed.

16. The non-transitory, computer-readable storage medium of claim 15, further comprising instructions cause the computer to perform, based on a determination that a user has entered into an agreement to purchase the ticket, automatically handling removing, from the primary market, the listing of the ticket.

17. The non-transitory, computer-readable storage medium of claim 15, wherein the second listing fee is less than the first price and wherein presenting an improved user interface on a client device of a seller is based on one or more criteria, the criteria including that a number of tickets sold by the seller is less than a threshold number.

18. The non-transitory, computer-readable storage medium of claim 15, wherein the instructions further cause the computer to perform determining the first price as a percentage of a first sales price.

19. The non-transitory, computer-readable storage medium of claim 18, wherein the instructions further cause the computer to determine the second listing fee based on historical transaction data pertaining to a measure of user loyalty.

20. The non-transitory, computer-readable storage medium of claim 15, wherein the instructions further cause the computer to perform determining a demand for a ticket and wherein presenting an improved user interface on a client device of a seller is based on the demand exceeding a demand threshold.

* * * * *